US005633731A

United States Patent [19]
Maemura

[11] Patent Number: 5,633,731
[45] Date of Patent: May 27, 1997

[54] FACSIMILE APPARATUS WHICH STORES IMAGE DATA TO BE TRANSMITTED AND RECEIVED IMAGE DATA IN IMAGE MEMORY THEREOF

[75] Inventor: Koichiro Maemura, Isehara, Japan

[73] Assignee: Ricoh Company, Ltd., Tokyo, Japan

[21] Appl. No.: 642,411

[22] Filed: May 3, 1996

Related U.S. Application Data

[63] Continuation of Ser. No. 439,554, May 11, 1995, abandoned, which is a continuation of Ser. No. 127,117, Sep. 27, 1993, abandoned, which is a continuation of Ser. No. 767,816, Sep. 30, 1991, abandoned.

[30] Foreign Application Priority Data

Oct. 5, 1990 [JP] Japan ................... 2-267919

[51] Int. Cl.⁶ ................... H04N 1/32; H04N 1/00
[52] U.S. Cl. ................... 358/468; 358/403; 395/200.01
[58] Field of Search ................... 358/401, 403, 358/404, 434–436, 439, 444, 460, 462, 468; 395/200.01, 200.02, 200.15, 831, 853

[56] References Cited

U.S. PATENT DOCUMENTS

| 4,887,162 | 12/1989 | Arai | 358/400 |
|---|---|---|---|
| 4,908,714 | 3/1990 | Iriyama et al. | 358/405 |
| 5,038,202 | 8/1991 | Ooishi et al. | 358/13 |
| 5,050,006 | 9/1991 | Ogawa | 358/402 |
| 5,065,254 | 11/1991 | Hishida | 358/400 |
| 5,068,888 | 11/1991 | Scherk et al. | 358/435 |
| 5,084,769 | 1/1992 | Miura | 358/403 |
| 5,084,770 | 1/1992 | Nakayama | 358/403 |
| 5,095,373 | 3/1992 | Hisano | 358/434 |
| 5,095,455 | 3/1992 | Sekiguchi | 358/405 |
| 5,153,744 | 10/1992 | Nobuta | 358/400 |
| 5,168,444 | 12/1992 | Cukor et al. | 364/401 |
| 5,258,998 | 11/1993 | Koide | 375/7 |

Primary Examiner—Wellington Chin
Assistant Examiner—Rafael Bacares
Attorney, Agent, or Firm—Oblon, Spivak, McClelland, Maier & Neustadt, P.C.

[57] ABSTRACT

A communication apparatus connected to first and second terminals via a line stores files of image data and file identification values therein, and communicates with the first terminal by transmitting/receiving the image data and/or file identification values. Since the communication apparatus allots the file identification values to each image data file to identify each file, a desired image data file can be transmitted to the first or second terminal when the first terminal transmits a predetermined instruction and a desired file identification value corresponding to the desired image data file to said communication apparatus. The present invention can be applied to a facsimile apparatus having an image memory.

18 Claims, 18 Drawing Sheets

FIG.2

| | a1 | a2 | a3 | a4 | a5 | a6 | a7 | a8 |
|---|---|---|---|---|---|---|---|---|
| 1 | | | | | | | | |
| . | | | | | | | | |
| i-1 | | | | | | | | |
| i | VALID/INVALID FLAG | WAITING FOR OUTGOING CALL/ SUCCESS/FAILURE | TEL | FILE NO. | OUTGOING CALL DATE | OUTGOING CALL TIMES | PAGE COUNTER | FIRST FILE NO. |
| i+1 | | | | | | | | |
| . | | | | | | | | |
| I | | | | | | | | |

FIG. 3

| | b1 | b2 | b3 | b4 | b5 | b6 |
|---|---|---|---|---|---|---|
| N | | | | | | |
| ... | | | | | | |
| n+1 | | | | | | |
| n | VALID/INVALID FLAG | KIND OF FILE | NUMBER OF PAGES | IMAGE DATA STORING AREA | ID | NEXT FILE NO. |
| n−1 | | | | | | |
| ... | | | | | | |
| 1 | | | | | | |

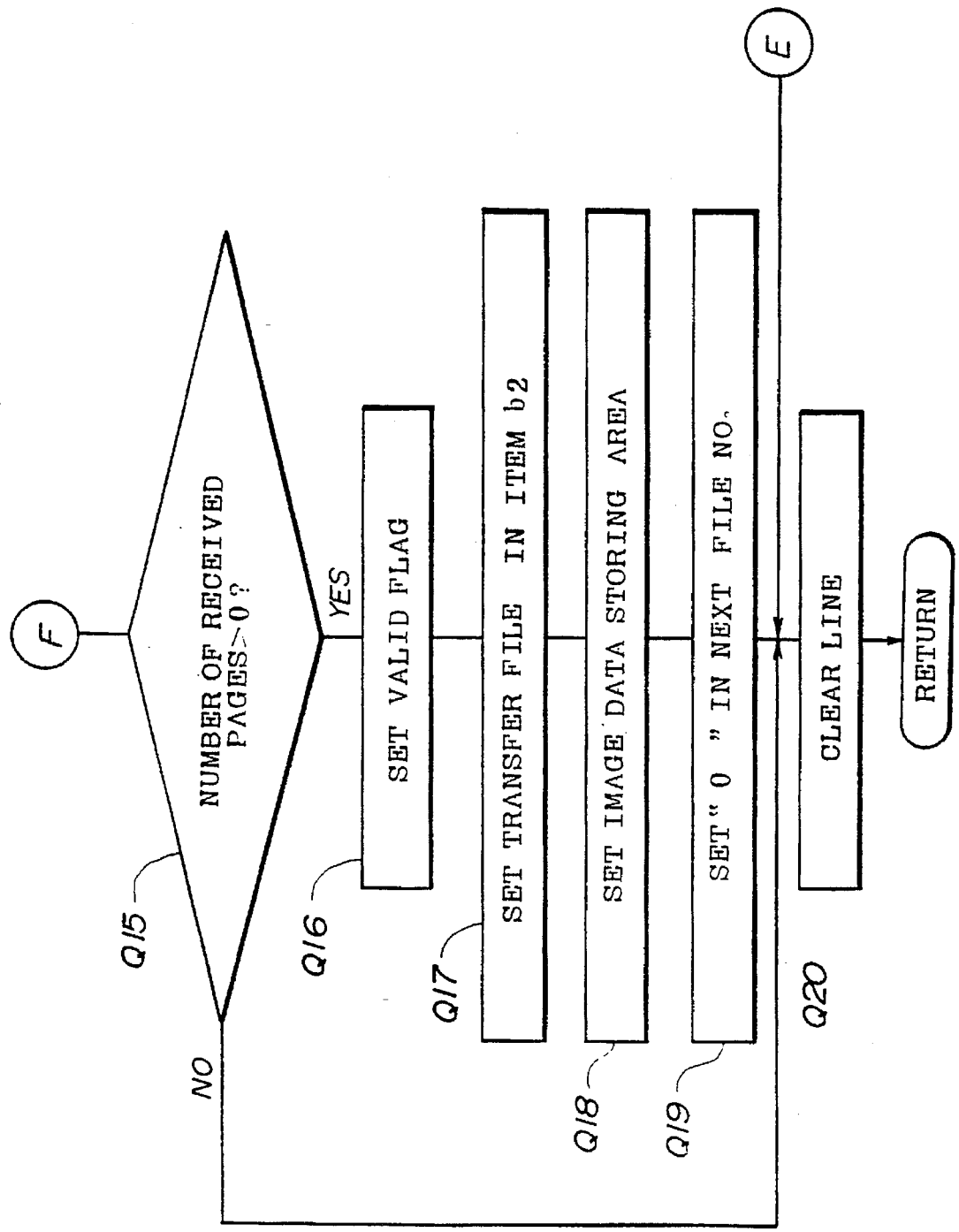

FACSIMILE APPARATUS WHICH STORES IMAGE DATA TO BE TRANSMITTED AND RECEIVED IMAGE DATA IN IMAGE MEMORY THEREOF

This application is a Continuation of application Ser. No. 08/439,554, filed on May 11, 1995, now abandoned, which is a Continuation of Ser. No. 08/127,117, filed on Sep. 27, 1993, now abandoned, which is a Continuation of Ser. No. 07/767,816, filed on Sep. 30, 1991, now abandoned.

BACKGROUND OF THE INVENTION

1. Field of the Invention

The present invention relates generally to facsimile apparatuses, and more particularly to a facsimile apparatus which stores image data to be transmitted and received image data in an image memory thereof.

2. Discussion of the Background

A facsimile apparatus (abbreviated FAX hereinafter), use of which has recently become wide-spread, has improved functions, a higher communication speed, and various communication methods. A conventional FAX, designed for high communication speed, has an image memory, such as a hard disk, in which image data to be transmitted and received image data are stored. Thus, an operator of the FAX can plot received image data at any time and then delete it. Another conventional FAX, designed for keeping faxes confidential, has a so-called confidential function for managing received image data in accordance with an ID which has been transmitted thereto with the image data. Thus, an operator can plot the received image data if he/she directly inputs the ID to the FAX. Still another conventional FAX has a transfer function for transferring image data to a designated terminal when a transfer instruction with the ID which has been stored in the image memory is input from a host machine thereto. Incidentally, since only one ID representing the FAX is provided for the FAX, the FAX transfers all the stored image data to the designated terminal when the transfer instruction with the ID is input thereto.

However, each of the above conventional FAXs has the following disadvantage. That is, even if an operator of a terminal connected to one of the above conventional FAXs wants to transmit desired data stored in the image memory thereto or another designated terminal, none of the above FAXs can transmit only the desired data to the terminal operated by the operator or the other designated terminal. Particularly, since the above conventional FAX having the transfer function transfers all of the image data including non-desired data to the other designated terminal, communication speed is low and a secret of the non-desired data will be leaked.

SUMMARY OF THE INVENTION

Accordingly, it is a general object of the present invention to provide a FAX in which the above disadvantage is eliminated.

The more specific object of the present invention is to provide a FAX having an image memory which can output only a desired image data stored in the image memory in response to an instruction transmitted from another terminal connected to the FAX.

According to one embodiment of the invention, there is a facsimile system in which a communication device is connected to a first terminal. The communication device has a memory for storing files of image data which are supplied from a source terminal. The communication device communicates to the first terminal via a transmission line by executing a facsimile communication control procedure. The communication device further includes a control means for allocating a file identification value to each of the files of the image data stored in the memory. Therefore, when an operator of the first terminal desires an image file to be transmitted thereto, the first terminal calls the communication device, requests the designated image file, and subsequently, that image file is transmitted to the first terminal.

In an alternate embodiment, the first terminal can call the communication device and after the first terminal transmits predetermined codes, the communication device can transmit the designated image file to a second terminal.

According to the present invention, since the communication apparatus transmits only a desired image file to the first/second terminal in response to an allocated file designation value, the confidentiality of the image file can be maintained.

Other objects and further features of the present invention will become apparent from the following detailed description when read in conjunction with the accompanying drawings.

BRIEF DESCRIPTION OF THE DRAWINGS

FIG. 2 shows an address management area stored in a RAM in a system controller of the facsimile apparatus shown in FIG. 1;

FIG. 3 shows a file management area stored in the RAM in the system controller of the facsimile apparatus shown in FIG. 1;

DETAILED DESCRIPTION OF THE PREFERRED EMBODIMENTS

Figure 1:
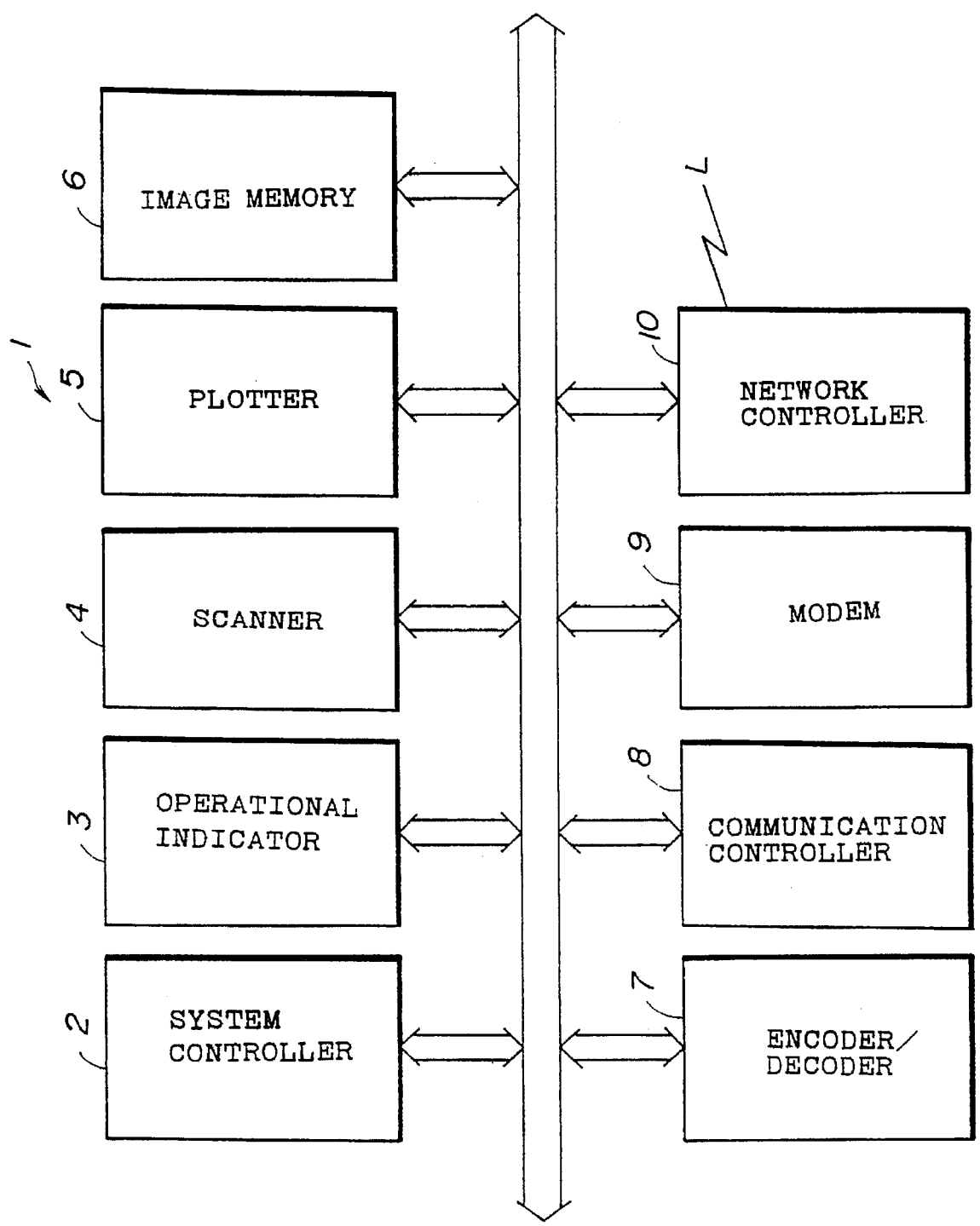
FIG. 1 shows a block diagram of a facsimile apparatus according to the present invention.

The FAX 1 according to the present invention comprises, as shown in FIG. 1, a system controller 2, an operational indicator 3, a scanner 4, a plotter 5, an image memory 6, an encoder/decoder 7, a communication controller 8, a MODEM 9 and a network controller 10. They are respectively connected via a bus with one another. Incidentally, the FAX 1 has the aforementioned transfer function.

The system controller 2 has a central processing unit (CPU), a read only memory (ROM) and a random access memory (RAM). The system controller 2 has a timer therein. The ROM stores a basic program of the FAX 1, and an image data management procedure program. The RAM stores various data for controlling each part of the FAX 1 and used for an image data management procedure. The RAM also stores an address management area shown in FIG. 2 and a file management area shown in FIG. 3. The system controller 2 sequence-controls each part of the FAX 1 in accordance with the programs stored in the ROM and performs the image data management procedure according to the present invention.

Figure 12:
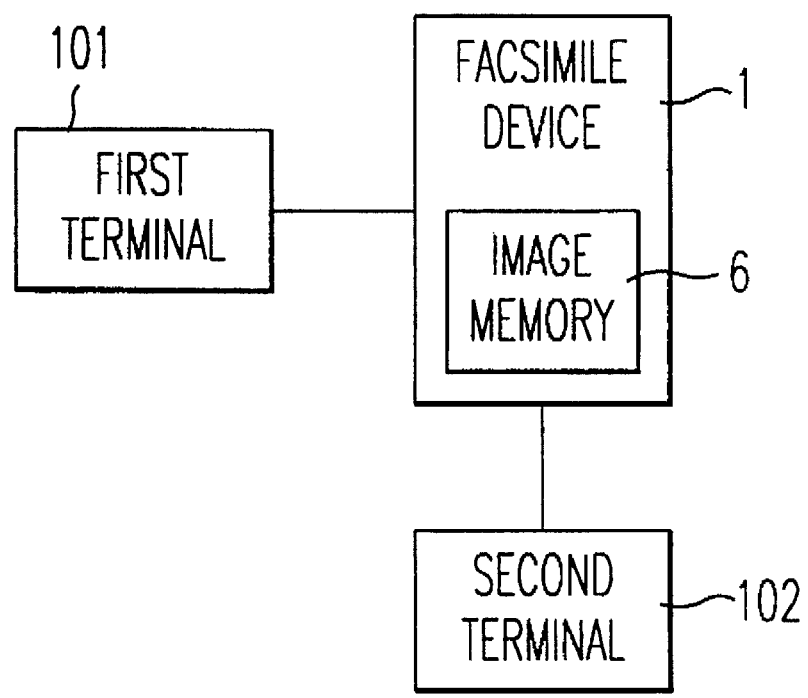
FIG. 12 shows the facsimile apparatus of FIG. 1A connected to two terminals.

FIG. 12 illustrates a system constructed in accordance with the present invention. The facsimile device 1 is shown connected to a first terminal 101 and a second terminal 101. To retrieve a desired image stored in the image memory 6, the first terminal 101 can call the facsimile device 1 and have transmitted thereto a desired image from the image memory 6. The first terminal indicates the desired image to the facsimile device 1 using a dual-tone, multi-frequency signal. If the desired image is to be transmitted to the first terminal 101, the first terminal 101 must also be a facsimile device.

Alternatively, it is also possible for the first terminal 101 to call the facsimile device 101 and by transmitting the appropriate codes which can be contained in a dual-tone multi-frequency signal, the facsimile device 1 can be instructed to transmit a desired image from the image memory 6 to the second terminal 102 which would be a facsimile device.

The address management area manages destination terminal data, a transmission result, reoutgoing condition data, and files to be transmitted. The address management area manages I*8 items, as shown in FIG. 2. A detailed description will now be given of the area "i" shown in FIG. 2. 'Valid' flag in an item a1 indicates that the area "i" is being used. On the other hand, 'Invalid' flag in the item a1 indicates the area "i" is not being used, that is, it is vacant. 'Waiting-for-outgoing-call' flag in an item a2 indicates that the FAX 1 is waiting to transmit an outgoing call to a destination terminal determined by an item a3 until a date determined by an item a5. A success flag in the item a2 indicates that the FAX 1 has succeeded in transmitting data and that the file will be deleted. 'Failure' flag in the item a2 indicates that the FAX 1 has failed to completely transmit all necessary pages even though the FAX 1 has transmitted an allowable number of reoutgoing calls. 'TEL' in an item a3 indicates a telephone number of the destination terminal. 'File No.' in an item a4 indicates a file number determined by the file management area shown FIG. 3. 'Outgoing call date' in an item a5 indicates a date of an outgoing call. 'Outgoing call times' in an item a6 indicates how many times the FAX 1 has atempted to transmit an outgoing call. 'Page counter' in an item a7 indicates from what page of the file specified by the item a4 is to be transmitted. 'First file No.' in the item a8 indicates a first file number among a plurality of files having the same ID specified by the item b5 of the file management area shown in FIG. 3.

On the other hand, the file management area manages a plurality of files of documents stored in the image memory 6 which the FAX 1 has received or will transmit. The file management area manages N*8 items, as shown in FIG. 3. A detailed description will now be given of the area "n" shown in FIG. 3. 'Valid' flag in an item b1 indicates that the area "n" is being used. On the other hand, 'Invalid' flag in the item b1 indicates the area "n" is not being used, that is, it is vacant. 'Kind of file' in an item b2 indicates what kind of file a file is, for example, whether a file is a confidential receipt file or a normal receipt file. 'Number of pages' in an item b3 indicates how many pages the document file in the image memory 6 has. 'Image data storing area' in an item b4 indicates where the file is stored in the image memory 6, which may be designated by an address or an area number. 'ID' in an item b5 indicates an identification of the file. 'Next file No.' in an item b6 indicates a next file number, the next file No. "0" indicating that a transfer instruction has not been transmitted, and the next file No. "OFFH" indicating the last file among a plurality of files having the same ID.

It is assumed that three files "n–1", "n", and "n+1" respectively have the same ID and the area "i" shown in FIG. 2 manages the three files. It is further assumed that an operator of a terminal connected to the FAX 1 has input the ID, and instructed the FAX 1 to transmit the three files to the operator. In this case, the valid flag in the item a1 sets, a telephone number of the operator's terminal is written down in the item a3, and "n–1" is written down in the item a8. If the FAX 1 has succeeded in transmitting all the three files to the operator by using one outgoing call, the valid flag in the item a1 and the success flag in the item a2 respectively set, the items a4, a5, and a7 may be blank, and "1" is written down in the item a6. Incidentally, "n+1" may be written down in the item a7. However, if the FAX 1 has failed to transmit from a second page of the file "n" to the end thereof and all the pages of the file "n+1" during the first outgoing call, the waiting-for-outgoing-call flag in the item a2 sets, "n" is written down in the file No. in the item a4, and "2" is written down in the item a7. Hereupon, it is assumed that the FAX 1 is allowed to attempt to transmit an outgoing call three times. Moreover, "n" is written down in the item b6 of the area "n–1", "n+1" is written down in the item b6 of the area "n", and "OFFH" is written down in the item b6 of the area "n+1". If the FAX 1 has failed to transmit the outgoing call during the times it has been allowed to attempt to do so, the failure flag in the item a1 sets.

The operational indicator 3 comprises various operational keys, such as ten keys and a start key, etc, and an indicator, such as a liquid crystal display. An operator can perform a data transmission and input a telephone number of a destination terminal via the various keys. In addition, in the image data management procedure, the operator can input an ID to plot image data. The input data is indicated on the indicator to inform the operator of it.

The scanner 4 may be comprised of a line image sensor using a charge coupled device (CCD) which reads out every line of a document to generate an image data.

The plotter 5 may be comprised of a thermal printer which records the image data on a recording paper directly or via an ink sheet.

The encoder/decoder 6, desirable for an effective and quick transfer operation, encodes image data whenever it is transmitted, and decodes coded image data into the original image data.

The image memory 6 may be comprised of a hard disk. The image memory 6 stores image data to be transmitted which is generated by scanning the document via the scanner 4 or received image data received from another FAX. Image data in the image memory 6 is file-managed based on management data by the system controller 2, as shown in FIGS. 2 and 3.

The communication controller 7 executes a FAX communication control procedure protocol between the FAX 1 and a destination terminal by transmitting control signals therebetween.

The network controller 9, connected to a line L, such as a telephone line, comprises an AA-NCU, which automatically establishes and/or releases a call, and detects a dual tone multifrequency (DTMF) signal transmitted via the line L and analyzes it to output the result to the system controller 2.

The MODEM 8 modulates a transmitting signal so as to transmit it via the line L during a data transmission procedure, and demodulates a received signal transmitted via the line L during a data receipt procedure.

Thus, the system controller 2 constitutes managing means for managing image data in the image memory 6 based on management data, such as IDs. In addition, the system controller 2, plotter 5, communication controller 8, MODEM 9 and network controller 10 constitute data transmission means for transmitting image data to a destination terminal.

A description will now be given of the operation of the FAX 1.

The FAX 1 encodes a transmitting image data scanned by the scanner 4 via the encoder/decoder 7 using a predetermined encoding method, then stores the encoded image data in the image memory 6, and transmits the data to a designated destination terminal by reading it out from the image memory 6 at a predetermined date.

In addition, the FAX 1 stores received image data in the image memory 6 directly or stores it therein after decoding it via the encoder/decoder 7 using a predetermined decode method, then plots the image data on a recording paper via the plotter 5 or transfers it to a designated terminal.

Further, the FAX 1 has a confidential function for managing a received image data in accordance with management data which has been transmitted with the received image data. When the management data is input to the FAX 1 via the operational indicator 3, the FAX 1 reads out the image data having the management data from the image memory 6 and then plots it via the plotter 5 on a recording paper.

Moreover, the FAX 1 can read out the image data having management data from the image memory 6 and transfer it to a designated terminal in response to a transfer instruction with the management data input via a telephone or another terminal.

Figure 4:
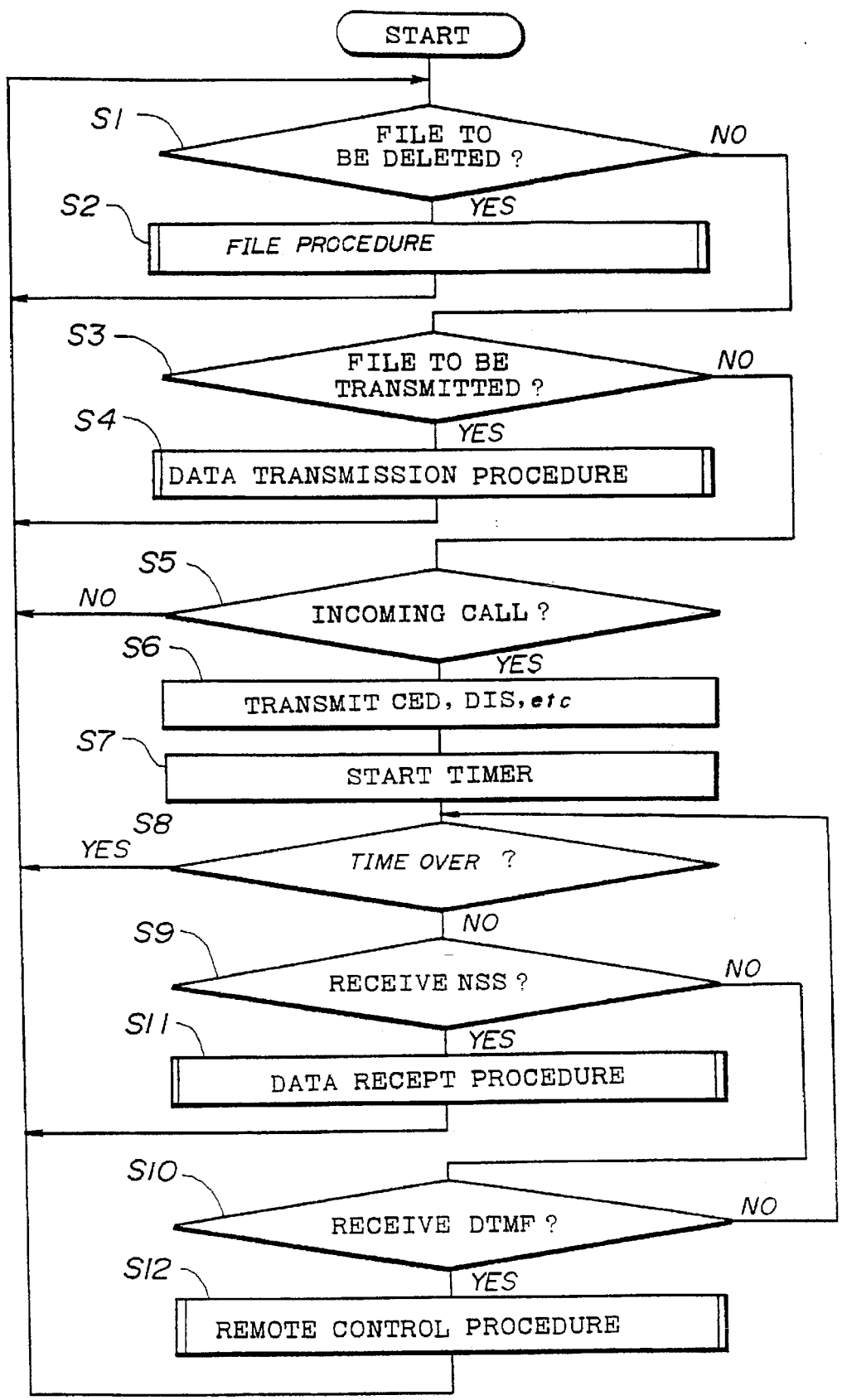
FIG. 4 shows a flowchart of a general procedure executed by the system controller in the facsimile apparatus shown in FIG. 1.

A description will now be given of the general procedure executed by the system controller 2 with reference to FIG. 4.

First, the FAX 1 judges if there is a file to be deleted among files stored in the RAM in the system controller 2 (in step S1). If there is a file to be deleted, the FAX 1 performs a file procedure, which will be described later (in step S2), and then the procedure is fed back to the step S1. But if there is no file to be deleted, the FAX 2 judges if there is a file to be transmitted among files stored in the RAM (in step S3). If there is a file to be transmitted, the FAX 1 performs a data transmission procedure, which will be described later (in step S4), and the procedure is fed back to the step S1. However, if there is no file to be transmitted in the step S3, the FAX 2 judges if there is an incoming call (in step S5).

If the FAX 1 receives an incoming call, the FAX 1 transmits a called station identification (CED) signal, non-standard facilities (NSF) signal, digital identification signal (DIS), and called station identification (CSI) signal, which are respectively defined by a G3 protocol defined by the Comité Consultatif International Télégraphique et Téléphonique (CCITT), to a transmitting terminal (in step S6). Then the system controller 2 starts a timer in the system controller 2 (in step S7), and judges if there is a non-standard facilities set-up (NSS) signal or a DTMF signal before the timer judges that a predetermined time has passed (in steps S8 to S10). If the FAX 1 receives the NSS signal before the timer judges that a pedetermined time has passed, the FAX 1 performs a data receipt procedure (in step 11), which will be described later, and the procedure is fed back to the step S1. However, if the FAX 1 has not received an incoming call in the step S5, or if the timer judges that a predetermined time has passed in the step S8, a procedure is fed back to the step S1. On the other hand, if the FAX 1 receives a DTMF signal in the step S10, the FAX 1 performs a remote control procedure (in step S12), which will be described later, and the procedure is fed back to the step S1.

Figure 5A:
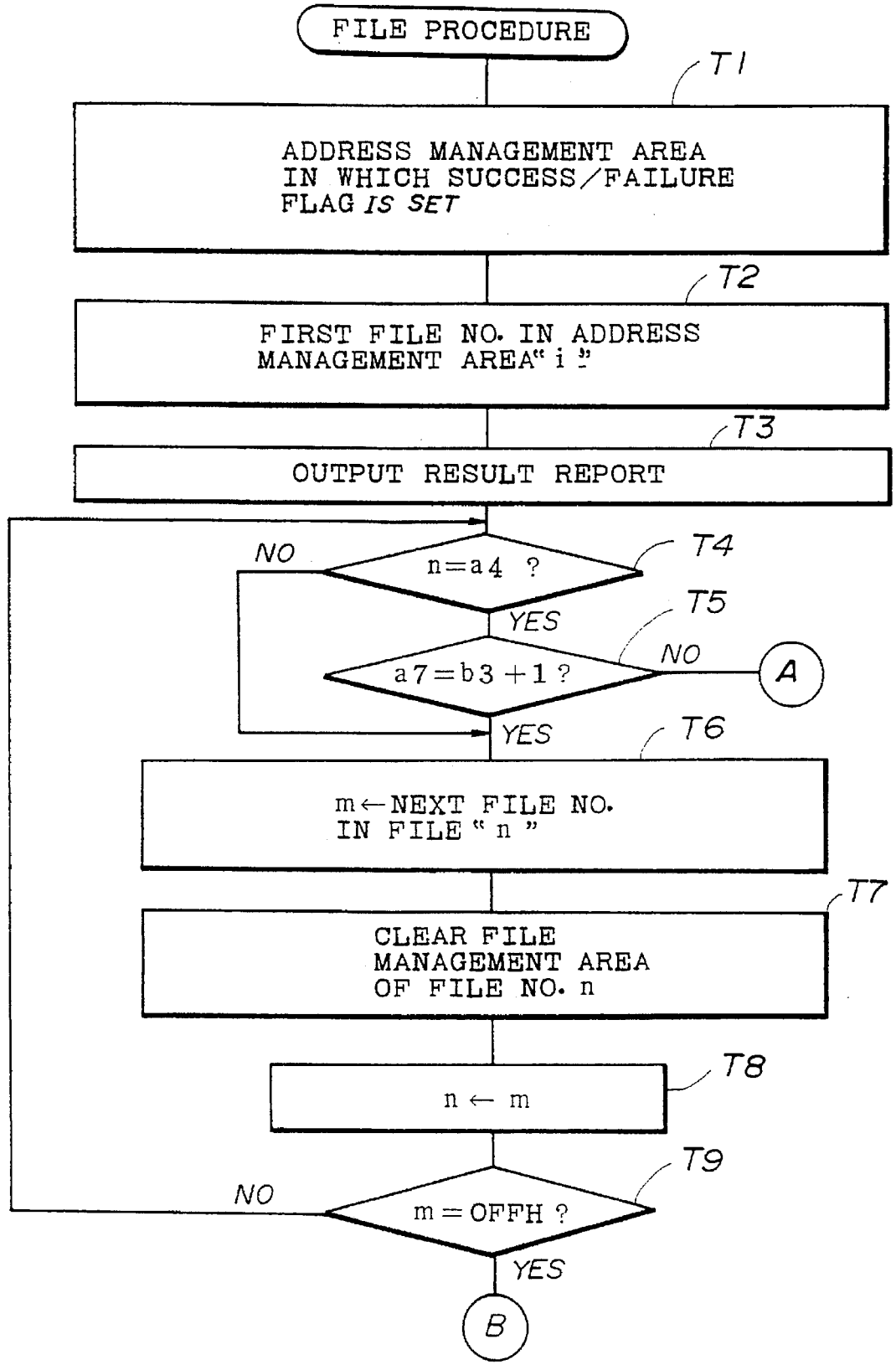
FIG. 5 shows a flowchart of a file management procedure executed by the system controller in the facsimile apparatus shown in FIG. 1.
Figure 5B:
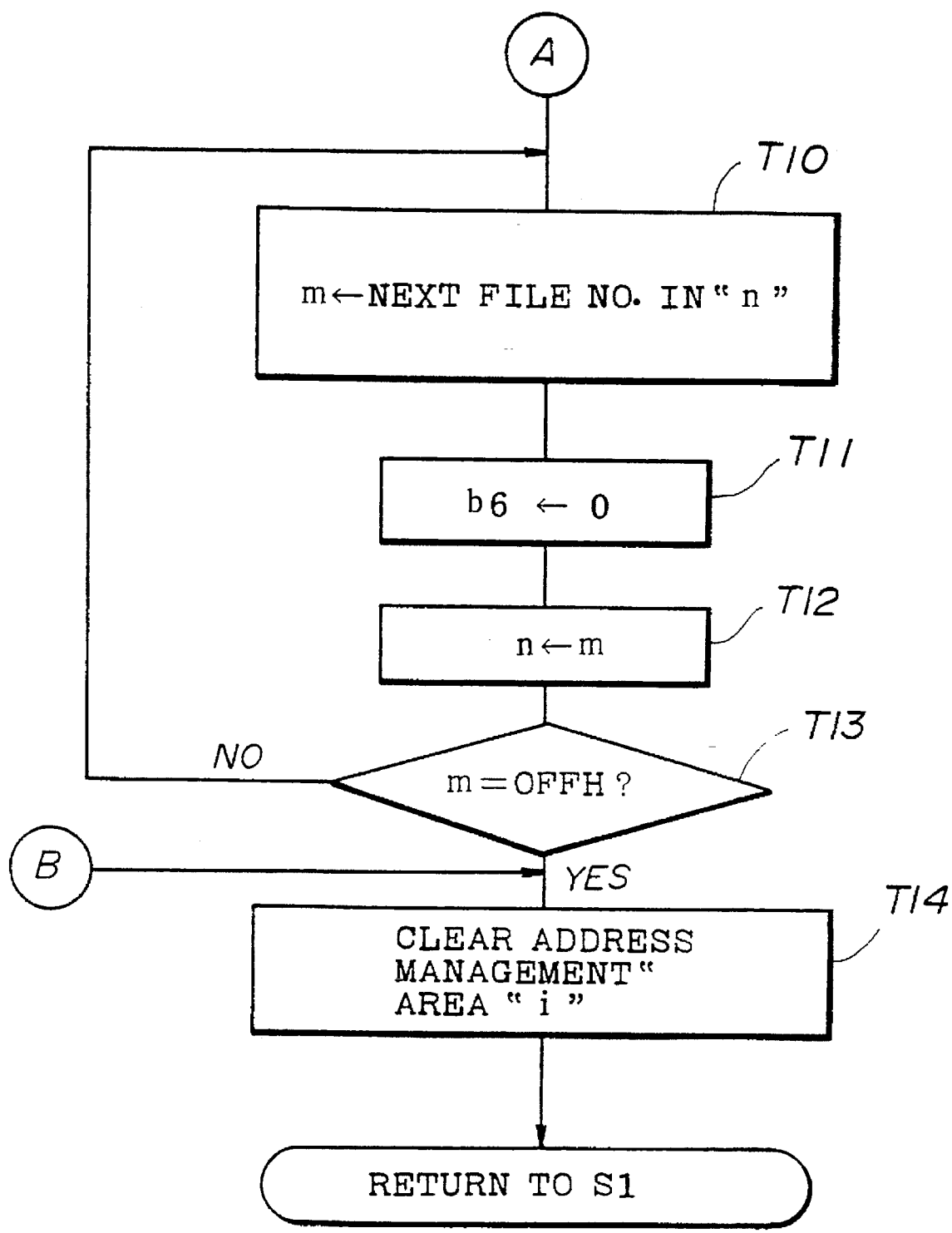

Next, a description will be given of the file procedure in the step S2 shown in FIG. 4, with reference to FIG. 5. The system controller 2 searches an address management area "i" in the RAM in which a success flag or a failure flag stands (in step T1). Then, the system controller 2 outputs a report representing the result of transmitting of data of a first file No. "n" in the address management area "i" (in steps T2 and T3). But whether the system controller 2 outputs the result of the above data transmission is a matter of choice. Next, the system controller 2 judges whether the No. "n" is written down in the item a4 of the address management area "i" (in step T4). If n=a4, the system controller 2 judges whether a value in the item a7 corresponds to a value in the item b3 added to 1 (in step T5). If a7=b3+1, the system controller 2 stores the next file No. "m" in the item b6 of the file No. "n" (in step T6) and then clears the file management area of file No. "n" (in step T7). Then, the file No. "m" is set in "n" (in step T8) and the system controller 2 judges whether the file No. "m" is OFFH, that is, the last file (in step S9). If it is not the last file, the procedure is fed back to the step T4.

If a7 is not equal to b3+1 in step S5, the system controller 2 stores the next file No. "m" in the file No. "n" (in step T10). Then "0" is set in the next file No. in the item b6 of the file No. "n" (in step T11) and the file No. "m" is set in "n" (in step T12). Then the system controller 2 judges whether the file No. "m" is the last file (in step T13). If the file No. "m" is not the last file, the procedure is fed back to the step T10. However, if it is judged to be the last file in the steps T9 and T13, the system controller 2 clears the address management area "i" (in step T14).

Figure 6A:
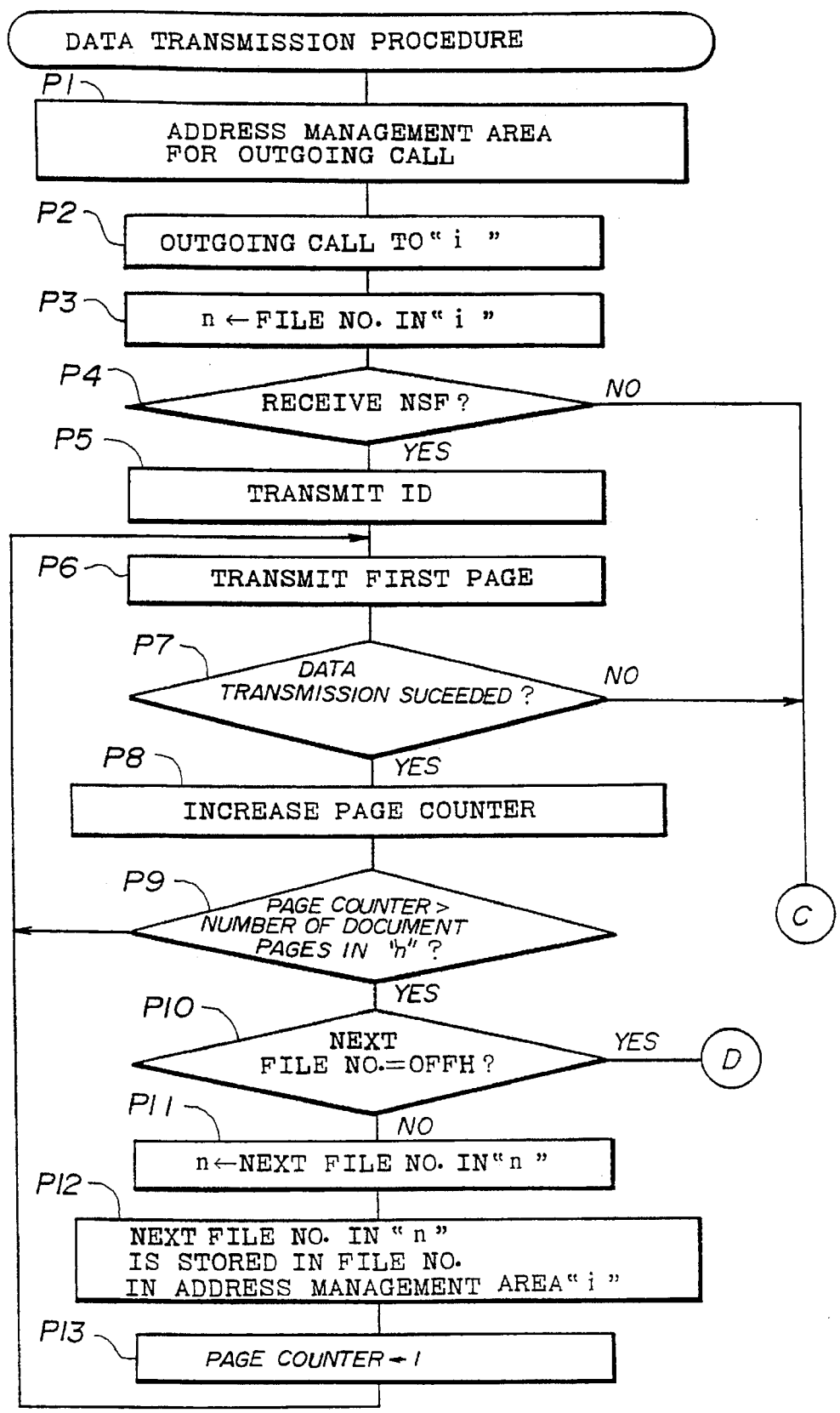
FIG. 6 shows a flowchart of a data transmission procedure executed by the system controller in the facsimile apparatus shown in FIG. 1.
Figure 6B:
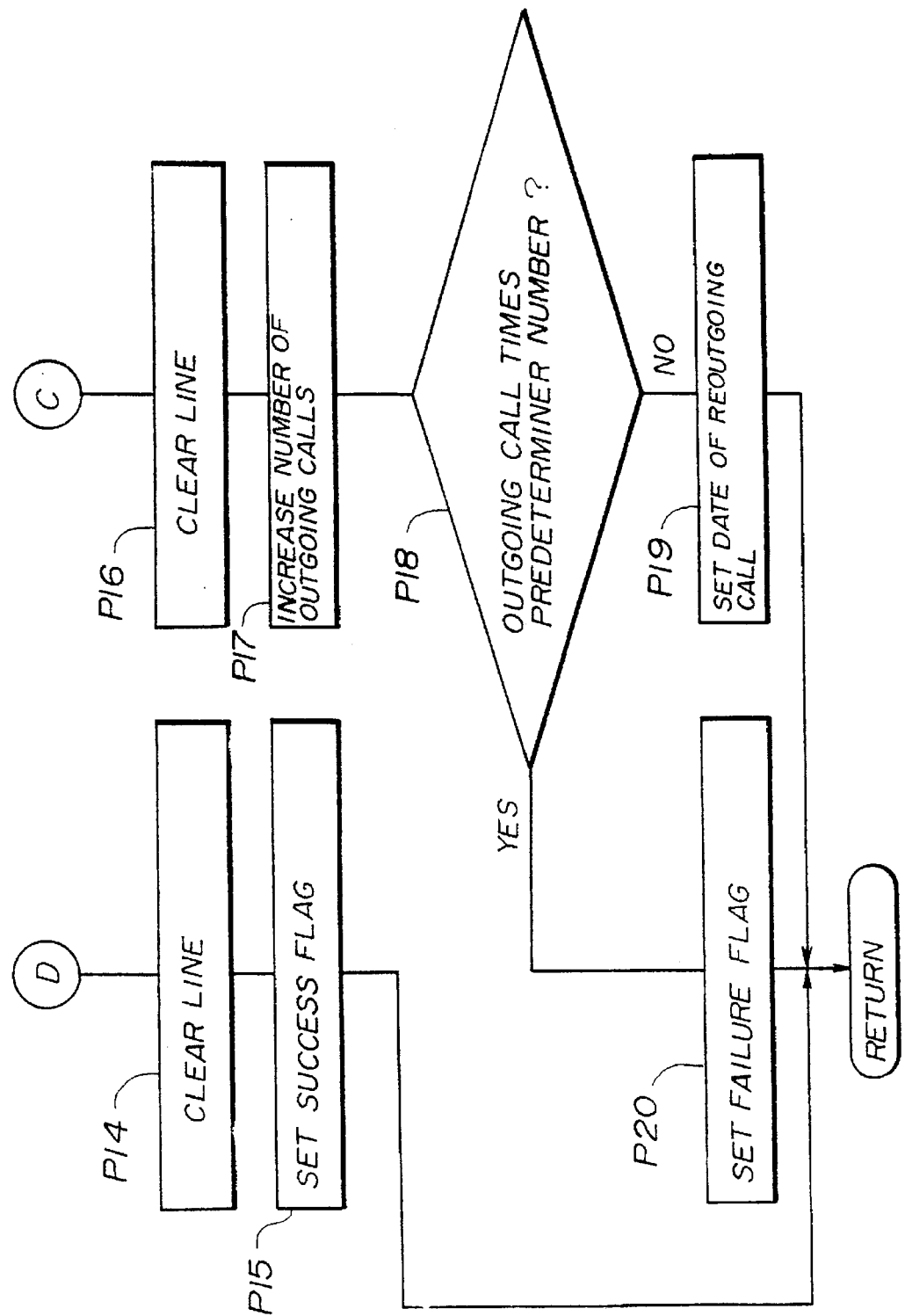

A description will now be given of the data transmission procedure in the step S4 shown in FIG. 4, with reference to FIG. 6. First, the system controller 2 searches an address management area "i" in the RAM in which a waiting-for-outgoing-call flag stands (in step P1), and then transmits an outgoing call to a destination terminal defined by the item a3 (in step P2). The address management area "i" has a file No. "n" in the item a4 (in step P3). Then the system controller 2 judges whether the FAX has received the NSF signal (in step P4). If the FAX has received the NSF signal, the FAX transmits the ID to the destination terminal (in step P5), and then transmits a first page of the image data by reading it out from the image memory 6 (in step P6). Then the system controller 2 judges whether the data has been transmitted successfully (in step P7). If the data has been transmitted successfully, the system controller 2 increases the page counter in the item a7 by 1 (in step P8). Then the system controller 2 judges whether a value of the page counter in the item a7 is larger than the number of the document pages in the item b3 of the file No. "n" (in step P9). If the value of the page counter is not larger than the number of the document pages, the procedure is fed back to the step P6. If the value of the page counter is larger than the number of the document pages and thus that all the document pages have been transmitted, the system controller 2 judges whether the next file No. is "OFFH" (in step P10). If it is not the last file, the next file No. is set as "n" and is registered in the file No. in the item b4 in the address management area "i" (in step P12). Then the system controller 2 returns the page counter to 1 (in step P13), and the procedure is fed back to the step P6.

If all the image data has been transmitted in the step P10, the FAX clears the line (in step P14) and sets the success flag in the address management area to terminate the procedure (in step P15). On the other hand, if the FAX does not receive the NSF signal in the step P4, or if the data has not been successfully transmitted, the system controller 2 clears the line (in step P16), and increases the number of outgoing calls by 1 (in step P17). Then the system controller 2 judges whether the number of outgoing calls has exceeded a predetermined number (in step P18). If the number of outgoing calls has not yet exceeded the predetermined number, the system controller 2 sets a date of a reoutgoing call in the item a5 and terminates the procedure (in step P19). However, if the number of outgoing calls has already exceeded the predetermined number, the FAX sets the failure flag in the item a2 and terminates the procedure (in step P20).

Figure 7A:
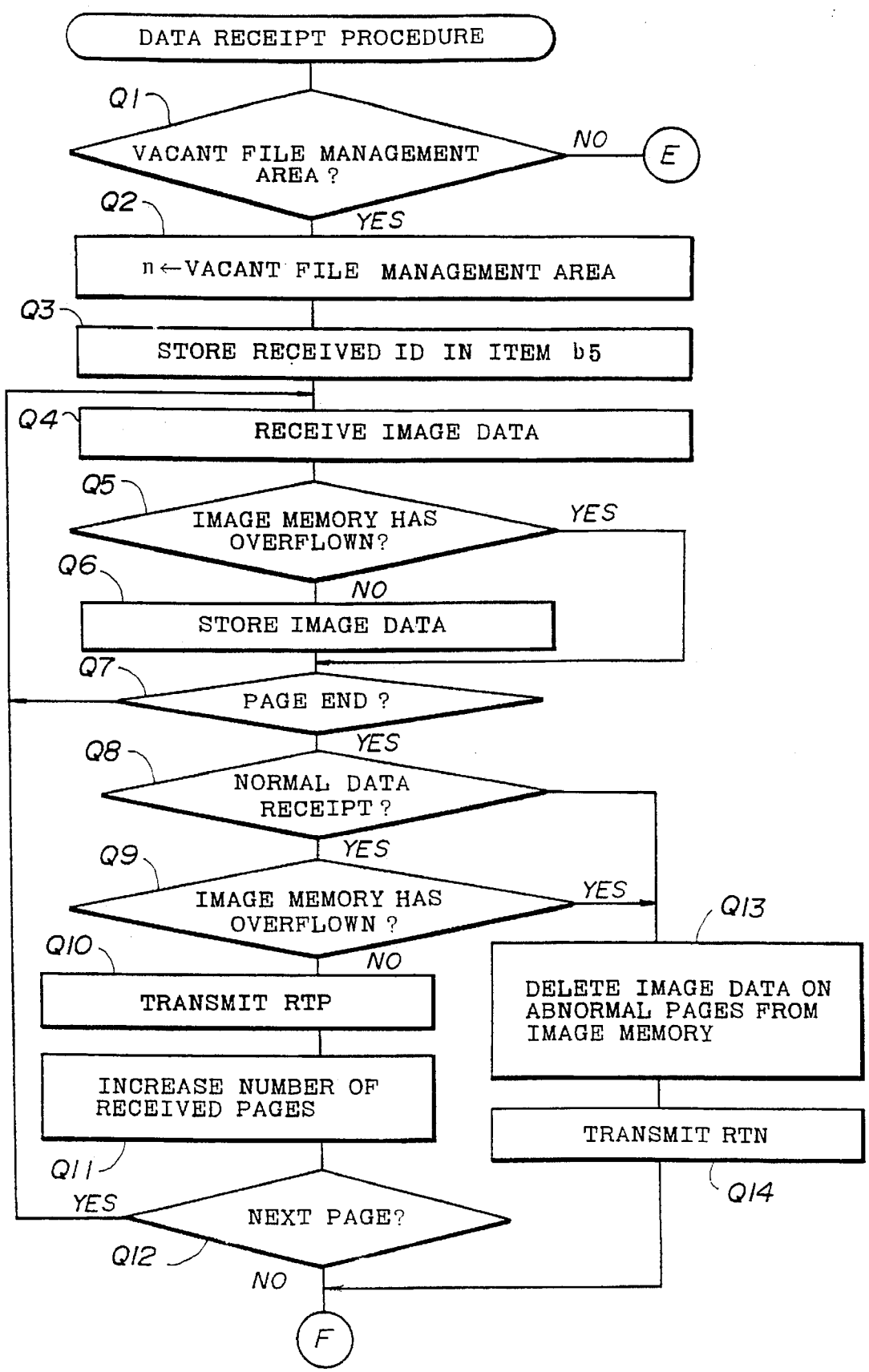
FIG. 7 shows a flowchart of a data receipt procedure executed by the system controller in the facsimile apparatus shown in FIG. 1.

Next, a description will be given of the data receipt procedure in the step S11 shown in FIG. 4, with reference to FIG. 7. When the FAX receives an incoming call, the FAX judges if there is an arbitrary vacant file management area "n" (in steps Q1 and Q2). If the system controller 2 finds it, the system controller 2 stores the received ID in the item b5 in this area (in step Q3). Then, the system controller 2 receives image data (in step Q4) and judges whether the image memory 6 has overflowed (in step Q5). If the image memory 6 has not overflowed yet, the FAX stores the received image data in the image memory 6 (in step Q6) and the system controller 2 judges whether the FAX 1 has received all the image data for a page (in step Q7). If the image memory 6 has already overflowed, the procedure is transferred to the step Q7. Then the system controller 2 judges whether the received image data is normal (in step Q8). If the FAX has normally received the image data, the system controller 2 judges whether the image memory 6 has overflowed (in step Q9). If not overflowed, the FAX transmits a retrain positive (RTP) signal to the destination terminal (in step Q10) and increases the number of received pages by 1 (in step Q11). Then the system controller 2 judges if there is a next page (in step Q12). If there is a next page, the procedure is fed back to the step Q4. If the FAX 1 has not normally received the image data in step Q8, or if the image memory Q6 has not overflowed yet, the system controller 2 deletes the image data of the abnormal page from the image memory 6 (in step Q13) and transmits a retrain negative (RTN) to the destination terminal (in step Q14). In this case, the procedure is transferred to the step Q15.

If the FAX receives image data for all the pages in the step Q12, the FAX judges whether a number of received pages is larger than 0, that is, if there is a normally received page (in step Q15). If there is a normally received page, the FAX sets the valid flag in the item b1 (in step Q16) and also sets a transfer file in the item b2 (in step Q17). Then the system controller 2 sets the image data storing area. Next the system controller 2 sets "0" in the file No. in the item b6 (in step Q19). Lastly, the FAX clears the line to terminate the data receipt procedure (in step Q20).

If there is judged to be no vacant file management area in the step Q1, or if there is judged to be no page normally received, the procedure is transferred to the step Q20.

Figure 8:
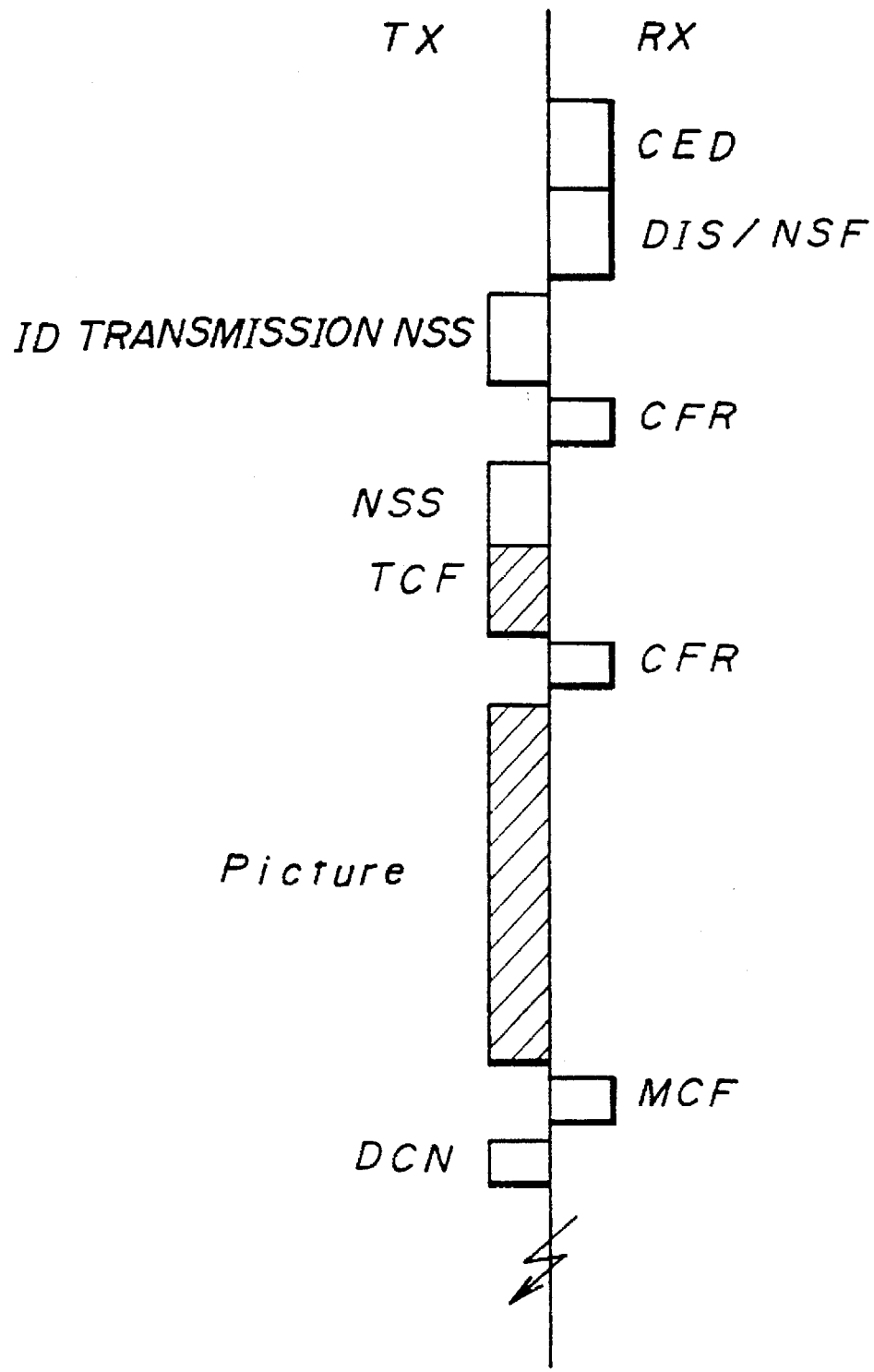
FIG. 8 shows a sequence view of a facsimile communication during a confidential communication of the facsimile apparatus shown in FIG. 1.

If the FAX receives a confidential transmission from a destination terminal, the FAX communicates with it via a predetermined FAX control signal. At this time, the FAX 1 transmits, as shown in FIG. 8, a CED signal, DIS signal and NSF signal in response to the incoming call. The NSF signal includes information indicating the FAX 1 has a confidential function. If the destination terminal admits the presence of the confidential function is in the FAX 1, the destination terminal transmits the NSS signal including management information, such as an ID. If the destination terminal receives the CFR signal from the FAX 1, the destination terminal transmits the NSF signal and image data subsequent to the NSF signal. The FAX 1 stores the received ID in the file management area to confirm which terminal is the destination terminal, which will be described later in detail.

Figure 9A:
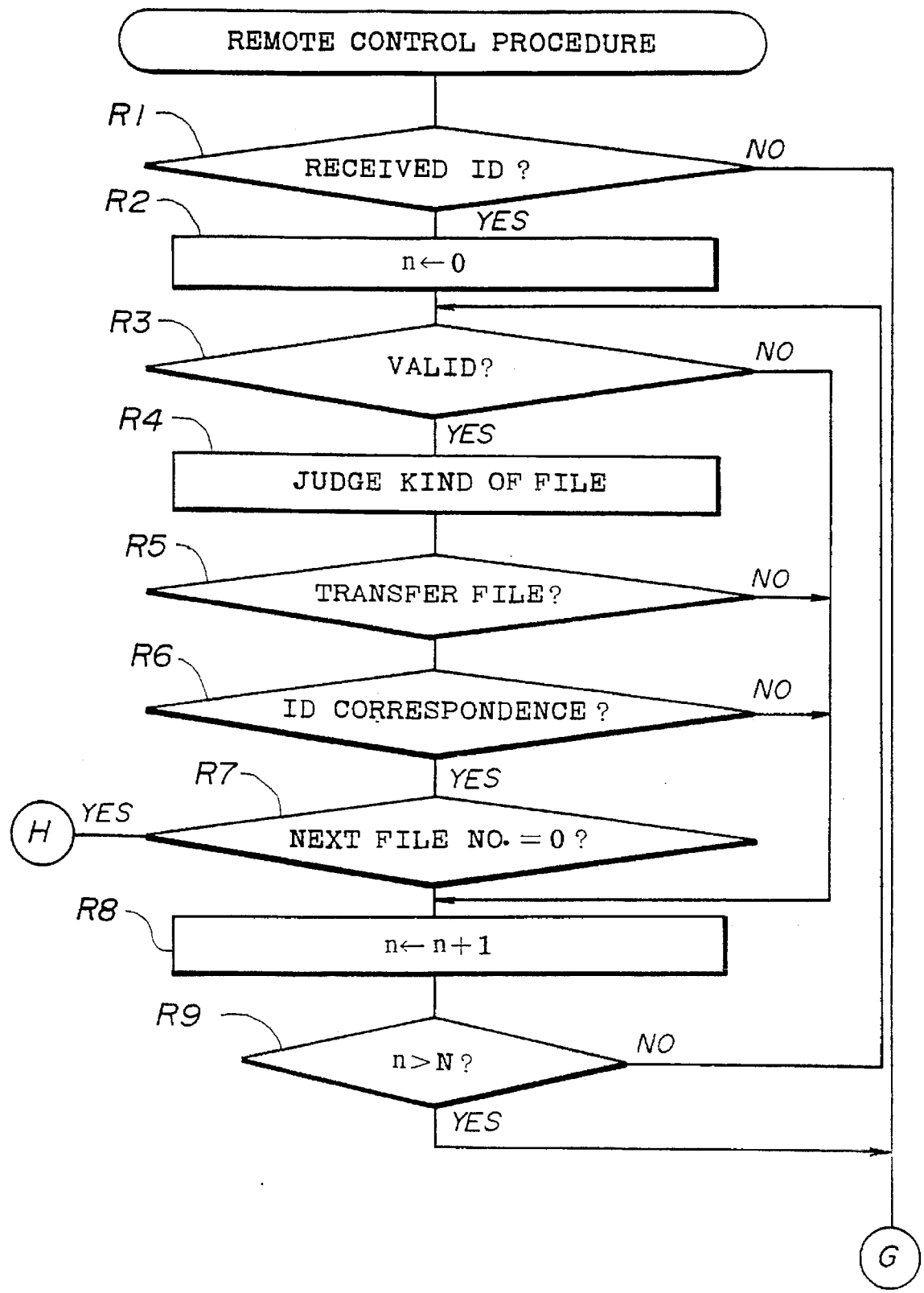
FIG. 9 shows a flowchart of a remote control procedure executed by the system controller in the facsimile apparatus shown in FIG. 1.
Figure 9B:
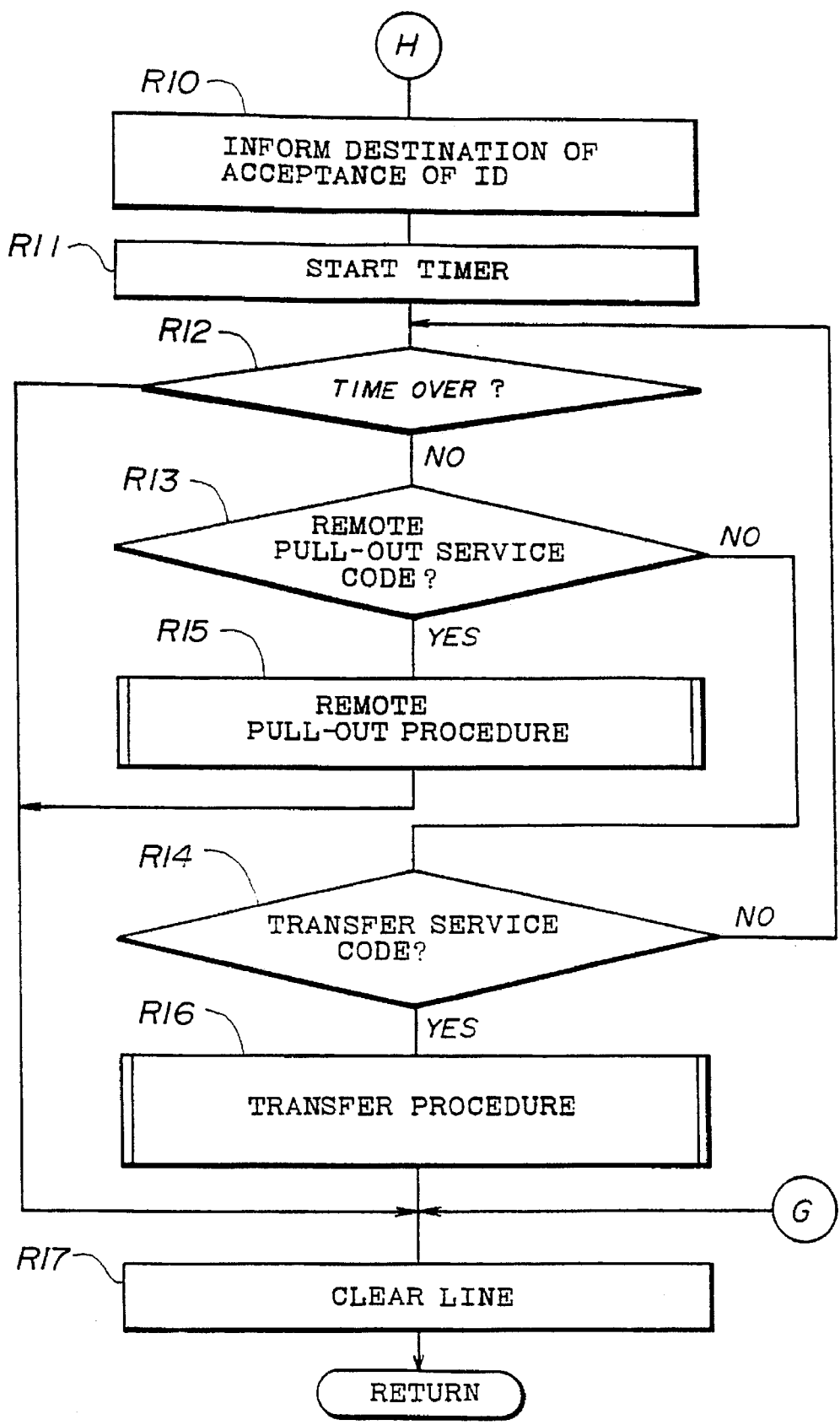

Next, a description will be given of the remote control procedure in the step S12 shown in FIG. 4, with reference to FIG. 9. First, the system controller 2 judges whether the FAX 1 has received an ID from the destination terminal (in step R1). If the FAX 1 has received the ID, the system controller 2 searches a valid file management area in the RAM which has the same ID and has not been transferred (in steps R2 to R9). That is, the system controller 2 sets "0" in the file management area "n" (in step R2), and then judges if there is a valid/invalid flag (in step R3). If there is a valid flag, the system controller 2 judges if there is a transfer file is set in the item b2 (in steps R4 and R5). If the transfer file is set in the item b2, the system controller 2 judges whether the ID in the item b5 is the same as the received ID (in step R6). If the IDs are the same, the system controller 2 judges whether "0" is set in the item b6 (in step R7). If not, the system controller 2 increases "n" by 1, and judges whether "n" has exceeded N. If n<N, the procedure is fed back to the step R3.

If "0" is set in the item b6 in the step R7, the FAX 1 informs the destination terminal that the ID has been accepted (in step R10). Then the system controller 2 starts a timer, and then judges if there is the transfer request or the remote pull-out request before the timer judges that the predetermined time has passed (in steps R12 to R14).

If the destination terminal requires a remote pull-out service code, the FAX 1 performs a remote pull-out procedure (in step R15) and then clears the line (in step R17). On the other hand, if the destination terminal requires a transfer service code (in step R14), the FAX 1 performs a transfer procedure (in step R16) and then clears the line (in step R17). If the timer judges that the predetermined time has passed before both requests are transmitted to the FAX 1, the procedure is transferred to the step R17.

If the FAX 1 has not received the ID in the step R1, the FAX 1 judges that the destination terminal has not allowed the FAX 1 to be remote-controlled and the procedure is transferred to the step R17. If n>N in the step R9, the FAX 1 judges that there is no file to be remote-controlled and thus the procedure is transferred to the step R17.

In summary, if there is a remote control request, the the system controller 2 searches a file management area having an ID corresponding to the received ID and performs a remote pull-out service or transfer service.

Figure 10A:
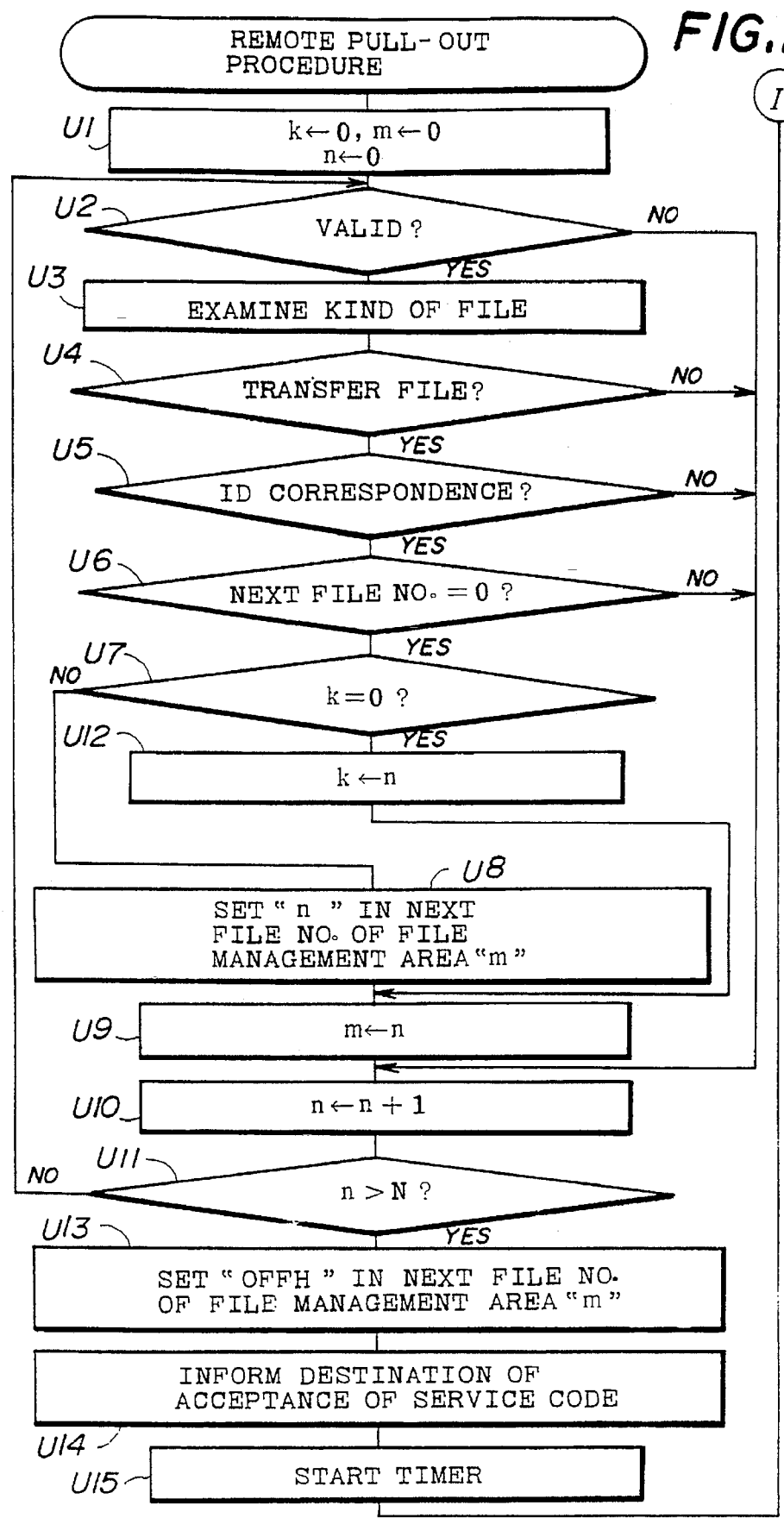
FIG. 10 shows a flowchart of a remote pull-out procedure executed by the system controller in the facsimile apparatus shown in FIG. 1.
Figure 10B:
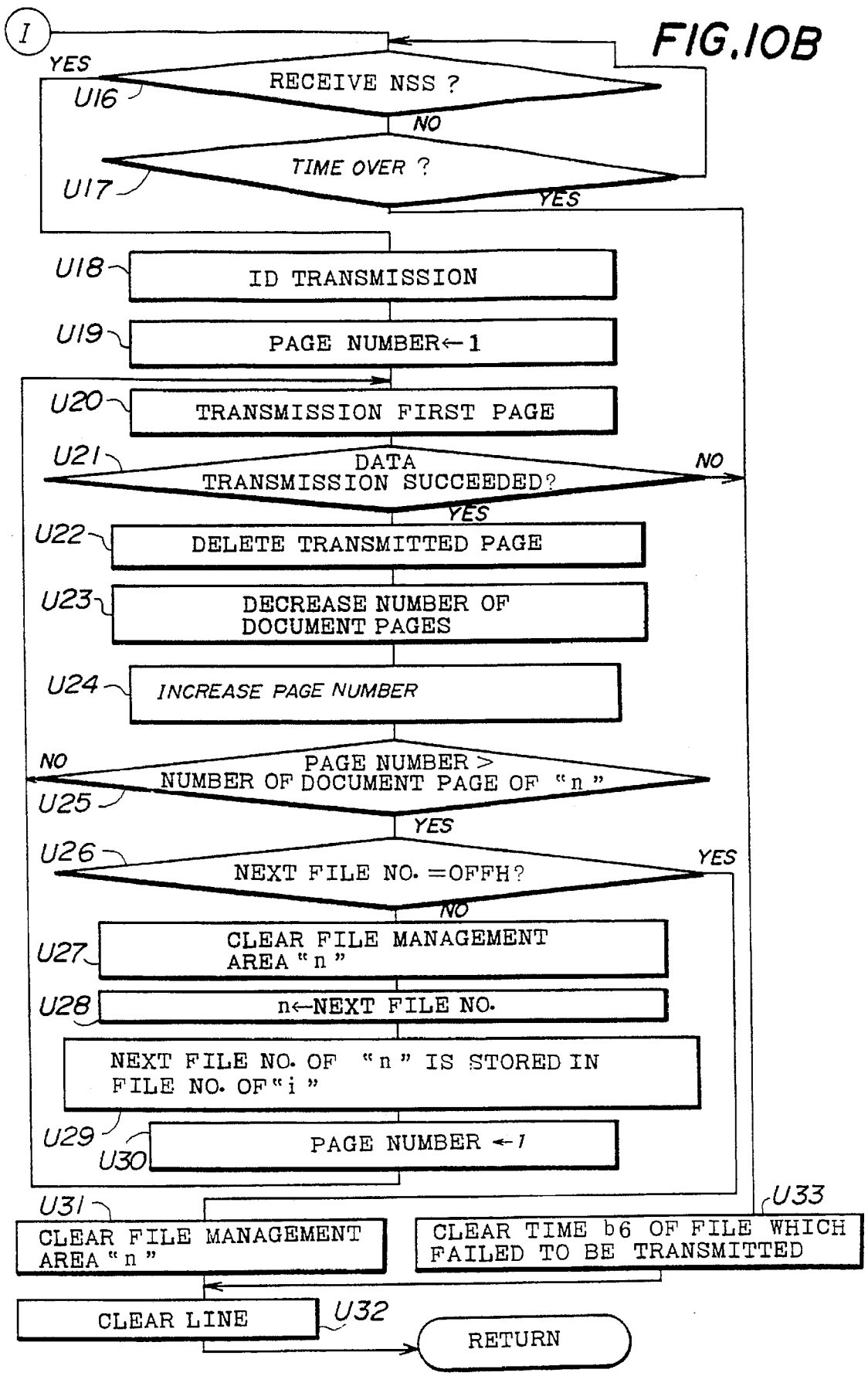

A description will now be given of the remote pull-out procedure in the step R10 shown in FIG. 9, with reference to FIG. 10. First, the system controller 2 sets "0" in the respective variables "k", "m" and "n", (in step U1) which respectively represent the file management areas, and then judges if a valid flag has been set (in step U2). If the valid flag has been set, the system controller 2 examines a kind of a file and judges whether the file is a transfer file (in steps U3 and U4). If the file is a transfer file, the system controller 2 judges whether an ID in the item b5 is the same as the received ID (in step U5). If the IDs are the same, the system controller 2 judges whether "0" is set in the item b6 (in step U6). If not, the system controller 2 increases "n" by 1 and judges whether "n" is larger than N. If n<N, the procedure is transferred to the step U2 (in steps U2 to U6, U10 and U11). If "0" is set in the item b6 in the step U6, the system controller 2 judges whether the variable "k" is "0" (in step U7). If the variable "k" is not "0", the system controller 2 sets "n" in the item b6 of the file management area "m" (in step U8) and substitutes "n" for "m" (in step U9). Then the system controller 2 increases "n" by 1 (in step U10). Subsequently, the system controller 2 judges whether "n" is larger than N (in step U11). If n<N, the procedure is fed back to the step U2.

If the variable "k" is "0" in the step U7, the system controller 2 substitutes "n" for the respective variables "k" and "m" (in steps U12 and U9). Then the system controller 2 increases "n" by 1 (in step U10). Subsequently, the system controller 2 judges whether "n" is larger than N (in step U11). If it is judged n<N, the procedure is fed back to the step U2. However, if n>N in the step U11, the system controller 2 sets the "OFFH" in the item b6 of the file management area "m" (in step U13) and then informs the destination terminal that the service code has been accepted (in step U14). Then, the system controller 2 starts the timer (in step U15), and judges the presence of a NSF signal before the timer judges that the predetermined time has passed (in steps U16 and U17). If the FAX 1 receives the NSF signal before the timer judges that the predetermined time has passed, the FAX 1 transmits the ID to the destination terminal (in step U18) and establishes number of pages as 1 to transmit the image data for 1 page (in steps U19 and U20). Then the system controller 2 judges whether one page has been normally transmitted (in step U21). If image data for one page has been transmitted, the FAX 1 deletes the transmitted pages from the image memory 6 (in step U22) and decreases the number of the transmitted document pages (in step U23). Subsequently, the system controller 2 increases the page number by 1 and judges whether the number of pages has exceeded the number pages of the file management area "n" (in steps U24 and U25). If the increased number of pages has not exceeded the number of the document pages of the file management area "n", the procedure is fed back to the step U20 (in steps U20 to U25). If the increased number of pages has exceeded the number of the document pages, the system controller 2 judges whether "OFFH" is set in the item b6 (in step U26). If "OFFH" is not set in the item b6, that is, it is not the last file, the system controller 2 deletes the file management area of file "n" and establishes the next file (in steps U28 and U29). Then the system controller 2 sets the number of pages as 1 (in step U30), and the procedure is transferred to the step U20. However, if "OFFH" is set in the item b6 in the step U26, the system controller 2 deletes the file management area "n" (in step U31) and clears the line since all the image data of the requested file has been transmitted (in step U32).

If the timer has judged that the predetermined time has passed before the FAX 1 receives the NSF signal in the step U17, or if the FAX 1 has failed to perform the data transmission in step U21, the system controller 2 clears the item b6 in the file management area which has been failed to be transmitted (in step U33) and then clears the line (in step U32).

Figure 11A:
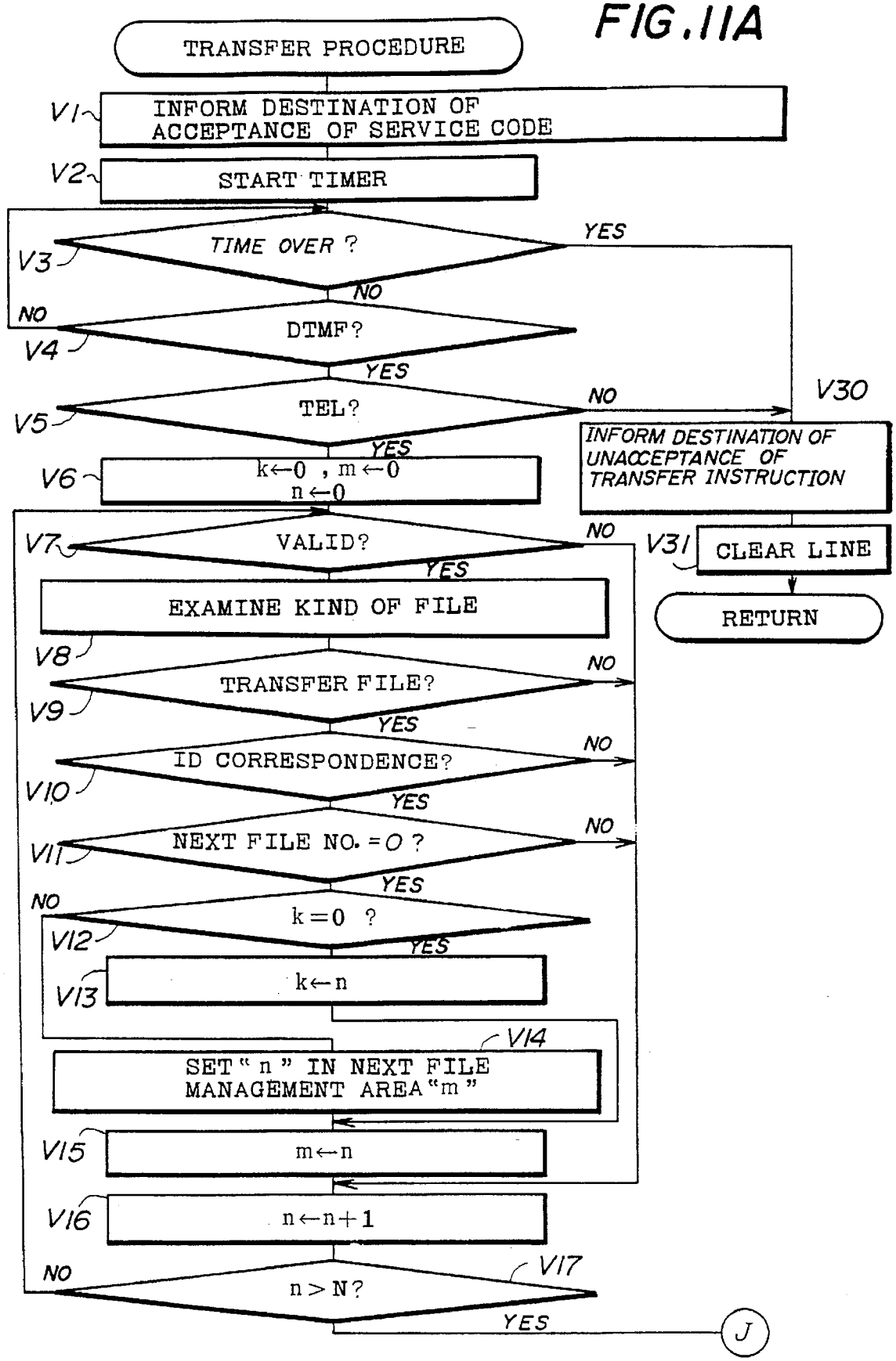
FIG. 11 shows a flowchart of a transfer procedure executed by the system controller in the facsimile apparatus shown in FIG. 1.
Figure 11B:
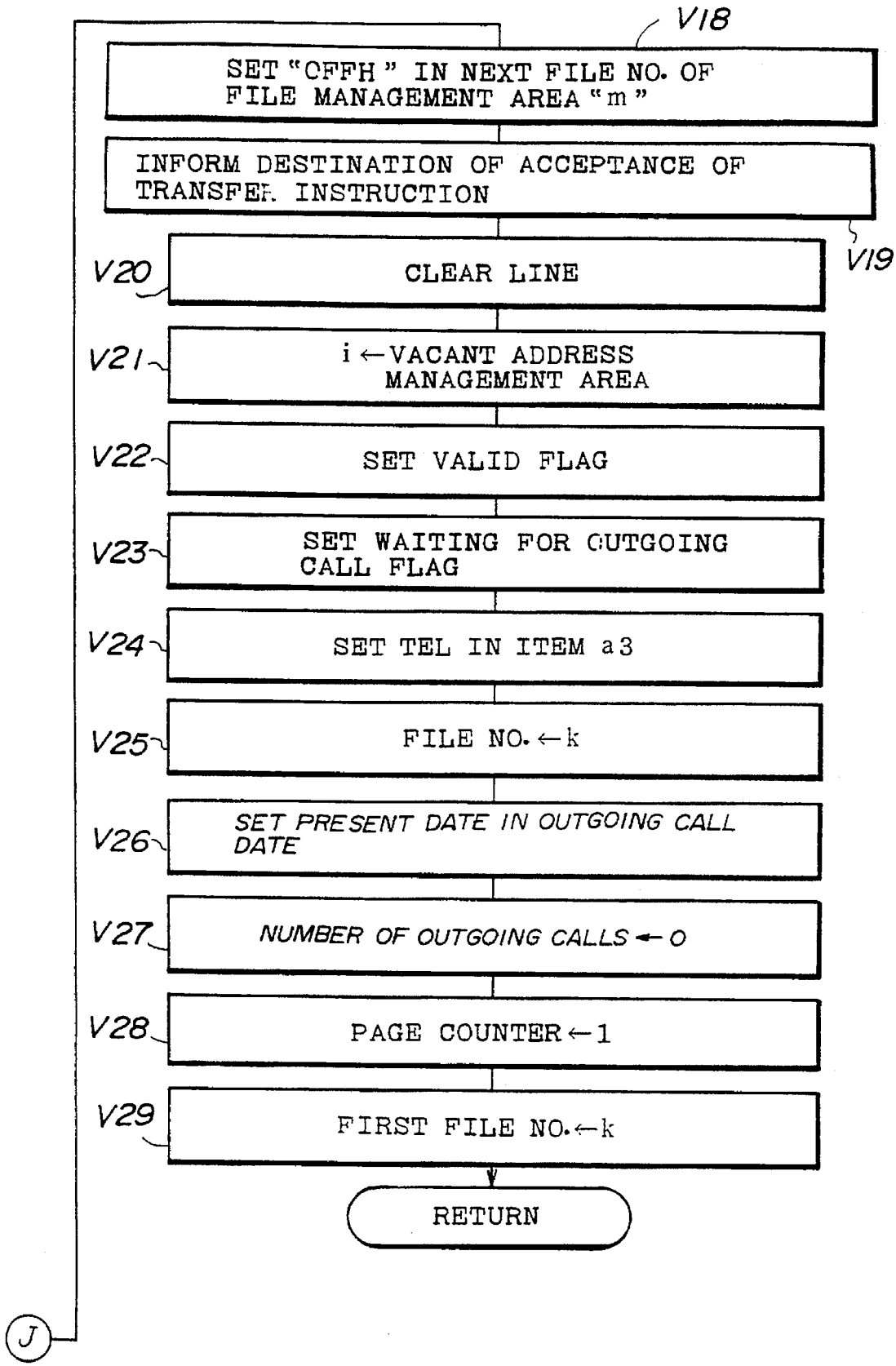

A description will now be given of the transfer procedure with reference to FIG. 11. First, the system controller 2 informs the destination terminal of the acceptance of the service code (in step V1) and starts the timer (in step V2). Then the system controller 2 judges if there is the DTMF signal before the timer times up (in step V3 and V4). If the FAX 1 receives the DTMF signal before the timer judges that the predetermined time has passed, the system controller 2 judges whether it has received the telephone number of a terminal to which image data is to be transmitted (in step V5). If the FAX 1 has received the telephone number of the terminal, it sets "0" in respective variables "k", "m" and "n" which respectively represent the file management areas (in step V6). Then the system controller 2 judges whether the file is valid (in step V7) and then judges whether the file is a transfer file (in steps V8 and V9). If the file is a transfer file, the system controller 2 judges whether an ID in the item b5 is the same as the received ID (in step V10). If the IDs are the same, the system controller 2 judges whether "0" is set in the item b6 (in step V11). If not, the system controller 2 increases "n" by 1 since it has judged that there is another file having the same ID (in step V16). Then the system controller 2 judges whether the increased "n" has exceeded N (in step V17). If n>N, the procedure is transferred to the step V7.

However, if the timer judges that the predetermined time has passed before the FAX 1 receives the DTMF signal in the step V3, or if the FAX 1 has not received the telephone number of the terminal in the step V5, the FAX 1 informs the destination terminal of unacceptance of the transfer instruction since the FAX 1 can properly transfer the image data (in step V30). Lastly, the FAX 1 clears the line to terminate the procedure (in step V31).

However, if "k" is "0" in the step V12, the system controller 2 sets "n" in "k" and "m" (in steps V13 and V15). Then the system controller 2 increases "n" by 1 (in step V16), and then judges whether "n" has exceeded N (in step V17). If n<N, the procedure is transferred to the step V7. On the other hand, if the file is invalid in the step V7, if the file is judged not to be a transfer file in the step V9, if the IDs are not the same in the step V10, or "0" is not set in the item b6, the system controller 2 increases "n" by 1 (in step V16) and judges whether "n" has exceeded N (in step V17). After the number N of files has been judged and if "n" has exceeded N, the system controller 2 sets "OFFH" in the item b6 in the file management area "m" (in step V18) and informs the destination terminal of the acceptance of the transfer instruction (in step V19). Then the FAX 1 clears the line (in step V20).

Next, the system controller 2 searches a vacant address management area "i" in the RAM (in step V21) and sets a valid flag and a waiting-for-outgoing-call flag (in steps V22 and V23). Then the system controller 2 sets the telephone number of the terminal by reading it out from the item a3 (in step V24). After the FAX 1 transmits the outgoing call to the terminal, it sets "k" in the item a4 (in step V25). In addition, the FAX 1 sets the present date in the outgoing call date (in step V26). Next, the system controller 2 sets "0" in the item a6 (in step V27), and sets "1" in the item a7 thereof (in step V28). Lastly, the system controller 2 sets "k" in the item a8 to terminate the procedure (in step V29).

Further, the present invention is not limited to these preferred embodiments, as various variations and modifications may be made without departing from the scope of the present invention.

What is claimed is:

1. A communication apparatus, comprising:

memory means for storing a plurality of image data, each having a plurality of files supplied from a source terminal;

communicating means, coupled to said memory means, for communicating with a first terminal, via a transmission line, by executing a facsimile communication control procedure when the communication apparatus is called by the first terminal; and control means for allocating a file identification value to each of the files of each image data stored in said memory means, said file identification value used to identify each file of each image data, and for controlling said memory means and said communicating means such that said communicating means transmits a designated file of said image data to the first terminal via the transmission line when a prescribed instruction including a specific file identification value allocated to said designated file is transmitted from the first terminal to the communication apparatus using a dual-tone multi-frequency signal, said control means comprising means for generating a table defining a relationship between the image data files and the file identification values allocated thereto, and indicating where the designated file of the image data is stored in said memory means;

wherein said communicating means includes means for receiving information indicating that the first terminal includes a confidential function and means for communicating the designated file using the confidential function; and when said communicating means has succeeded in transmitting the designated file of the image data to the first terminal, said control means deletes the designated file from the memory means.

2. A communication apparatus, comprising:

memory means for storing a plurality of image data, each having a plurality of files supplied from a source terminal;

communicating means, coupled to said memory means, for communicating with a first terminal, via a transmission line, by executing a facsimile communication control procedure when the communication apparatus is called by the first terminal; and control means for allocating a file identification value to each of the files of each image data stored in said memory means, said file identification value used to identify each file of each image data, and for controlling said memory means and said communicating means such that said communicating means transmits a designated file of said image data to a second terminal via the transmission line when a prescribed instruction including a specific file identification value allocated to said designated file and a terminal identification value allocated to said designated file and a terminal identification number used to call the second terminal is transmitted from the first terminal to the communication apparatus using a dual-tone multi-frequency signal, said control means comprising means for generating a table defining a relationship between the image data files and the file identification values allocated thereto, and defines an identification number of the second terminal, and indicates where the designated file of the image data is stored in said memory means;

wherein said communicating means includes means for performing a confidential function and said communicating means transmits the designated file using the confidential function; and wherein said control means includes means for deleting the table, when said communicating means has succeeded in transmitting the designated file and the image data to the second terminal.

3. A communication apparatus, comprising:

memory means for storing a plurality of image data, each having a plurality of files supplied from a source terminal;

communicating means, coupled to said memory means, for communicating with a first terminal, via a transmission line, by executing a facsimile communication control procedure when the communication apparatus is called by the first terminal; and control means for allocating a file identification value to each of the files of each image data stored in said memory means, said file identification value used to identify each file of each image data, and for controlling said memory means and said communicating means such that said communicating means transmits a designated file of said image data to the first terminal via the transmission line when a prescribed instruction including a specific file identification value allocated to said designated file is transmitted from the first terminal to the communication apparatus using a dual-tone multi-frequency signal, said control means comprising means for generating a table defining a relationship between the image data files and the file identification values allocated thereto, and indicating where the designated file of the image data is stored in said memory means;

wherein said communicating means includes means for receiving information indicating that the first terminal includes a confidential function and means for communicating the designated file using the confidential function; and said communication means comprises means for attempting to retransmit the designated file of the image data to the first terminal until a predetermined number of transmission attempts have been made, when said communication means failed to transmit the designated file of the image data to the first terminal.

4. A communication apparatus according to claim 3, wherein said control means further comprises means for writing, in the table, when said communicating means attempts to transmit and attempts to retransmit the designated file of the image data and the communication means retransmits the designated file using the writings in the table.

5. A communication apparatus according to claim 3, wherein said control means further comprises means for writing, in the table, where the designated file of the image data is stored so that the communication means retransmits the designated file in accordance with the table which indicates where the designated file is stored.

6. A communication apparatus according to claim 3, wherein, if said communication means has failed to transmit the designated file of the image data after the predetermined number of transmission attempts, said control means stops attempting to transmit the designated file of the image data and deletes the table.

7. A communication apparatus, comprising:

memory means for storing a plurality of image data, each having a plurality of files supplied from a source terminal;

communicating means, coupled to said memory means, for communicating with a first terminal, via a transmission line, by executing a facsimile communication control procedure when the communication apparatus is called by the first terminal; and control means for allocating a file identification value to each of the files of each image data stored in said memory means, said file identification value used to identify each file of each image data, and for controlling said memory means and said communicating means such that said communicating means transmits a designated file of said image data to a second terminal via the transmission line when a prescribed instruction including a specific file identification value allocated to said designated file and a terminal identification value allocated to said designated file and a terminal identification number used to call the second terminal is transmitted from the first terminal to the communication apparatus using a dual-tone multi-frequency signal, said control means comprising means for generating a table defining a relationship between the image data files and the file identification values allocated thereto, and defines an identification number of the second terminal, and indicates where the designated file of the image data is stored in said memory means;

wherein said communicating means includes means for performing a confidential function and said communicating means transmits the designated file using the confidential function; and said communication means comprises means for attempting to retransmit the designated file of the image data to the first terminal until a predetermined number of transmission attempts have been made, when said communication means failed to transmit the designated file of the image data to the first terminal.

8. A communication apparatus according to claim 7, wherein said control means further comprises means for writing, in the table, when said communicating means attempts to transmit and attempts to retransmit the designated file of the image data and the communication means retransmits the designated file using the writings in the table.

9. A communication apparatus according to claim 7, wherein said control means further comprises means for writing, in the table, where the designated file of the image data is stored so that the communication means retransmits the designated file in accordance with the table which indicates where the designated file is stored.

10. A communication apparatus according to claim 7, wherein, if said communication means has failed to transmit the designated file of the image data after the predetermined number of transmission attempts, said control means stops attempting to transmit the designated file of the image data and deletes the table.

11. A communication apparatus according to claim 1, wherein, when a dual-tone multi-frequency signal transmitted from the first terminal, said dual-tone multi-frequency signal indicating a specific file identification value included in a prescribed instruction, is received by the communication apparatus after the communication apparatus is called by the first terminal, said communicating means performs a remote control procedure to transmit a designated file of said image data, indicated by the dual-tone multi-frequency signal, to the first terminal via the transmission line.

12. A communication apparatus according to claim 1, wherein, when a prescribed facsimile communication control signal transmitted from the first terminal is received by the communication apparatus after the communication apparatus is called by the first terminal, said communicating means performs a data receiving procedure to receive facsimile data from the first terminal via the transmission line.

13. A communication apparatus according to claim 1, wherein, when neither a prescribed facsimile communication control signal nor a dual-tone multi-frequency signal from the first terminal is received by the communication apparatus within a predetermined time after the communication apparatus is called by the first terminal, said communication apparatus is released from the transmission line.

14. A communication apparatus according to claim 2, wherein, when a dual-tone multi-frequency signal transmitted from the first terminal, said dual-tone multi-frequency signal indicating a specific file identification value included in a prescribed instruction, is received by the communication apparatus after the communication apparatus is called by the first terminal, said communicating means performs a remote control procedure to transmit a designated file of said image data, indicated by the dual-tone multi-frequency signal, to the second terminal via the transmission line.

15. A communication apparatus according to claim 2, wherein, when a prescribed facsimile communication control signal transmitted from the first terminal is received by the communication apparatus after the communication apparatus is called by the first terminal, said communicating means performs a data receiving procedure to receive facsimile data from the first terminal via the transmission line.

16. A communication apparatus according to claim 2, wherein, when neither a prescribed facsimile communication control signal nor a dual-tone multi-frequency signal from the first terminal is received by the communication apparatus within a predetermined time after the communication apparatus is called by the first terminal, said communication apparatus is released from the transmission line.

17. A communication apparatus according to claim 2, wherein said control means controls said memory means and said communicating means such that said communicating means transmits a number of image data files, stored in said memory means, to the second terminal via the transmission lines when valid flags of said files are set and the file identification values of said files are the same as the file identification value included in said instruction from the first terminal.

18. A communication apparatus according to claim 7, wherein said control means controls said memory means and said communicating means such that said communicating means transmits a number of image data files, stored in said memory means, to the second terminal via the transmission lines when valid flags of said files are set and the file identification values of said files are the same as said file identification value included in said instruction from the first terminal.

* * * * *